United States Patent
Oka

(10) Patent No.: US 10,418,745 B2
(45) Date of Patent: Sep. 17, 2019

(54) WATERPROOF CONNECTOR

(71) Applicant: Sumitomo Wiring Systems, Ltd., Yokkaichi, Mie (JP)

(72) Inventor: Kazumi Oka, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 16/092,599

(22) PCT Filed: Apr. 25, 2017

(86) PCT No.: PCT/JP2017/016343
§ 371 (c)(1),
(2) Date: Oct. 10, 2018

(87) PCT Pub. No.: WO2017/188234
PCT Pub. Date: Nov. 2, 2017

(65) Prior Publication Data
US 2019/0173222 A1    Jun. 6, 2019

(30) Foreign Application Priority Data

Apr. 28, 2016 (JP) ................................. 2016-090029

(51) Int. Cl.
*H01R 13/52* (2006.01)
*F16J 15/10* (2006.01)

(52) U.S. Cl.
CPC .......... *H01R 13/5202* (2013.01); *F16J 15/10* (2013.01)

(58) Field of Classification Search
CPC . H01R 13/741; H01R 13/743; H01R 13/5202
(Continued)

(56) References Cited

U.S. PATENT DOCUMENTS 5,501,609 A * 3/1996 Watanabe .......... H01R 13/5202
439/273
6,113,424 A * 9/2000 Shinozaki .......... H01R 13/5202
439/556
(Continued)

FOREIGN PATENT DOCUMENTS

JP    10-318373       12/1998
JP    2011-179618     9/2011
(Continued)

OTHER PUBLICATIONS

International Search Report dated Jul. 11, 2017.

*Primary Examiner* — Hien D Vu
(74) *Attorney, Agent, or Firm* — Gerald E. Hespos; Michael J. Porco; Matthew T. Hespos

(57) ABSTRACT

A connector housing (20) includes a receptacle (22) to be arranged in an opening (91) of a panel (90) obliquely with respect to a plate surface of the panel (90) and a jaw (27) protruding out from the housing body and having one surface facing the plate surface of the panel (90). A sealing member (50) has an annular shape to surround an outer periphery of the connector housing (20) and includes a panel lip (57) to be held in close contact with the plate surface of the panel (90) and inner and outer housing lips (58) to be held in close contact with the one surface of the jaw (27). A thickness of the sealing member in an in-out direction is reduced from the side of the housing lips (58) to the side of the panel lip (57).

3 Claims, 8 Drawing Sheets

(58) Field of Classification Search
USPC .................................. 439/557, 556, 954
See application file for complete search history.

(56) References Cited

U.S. PATENT DOCUMENTS 6,575,787 B2 * 6/2003 Ishikawa ............ H01R 13/5202
434/278
2015/0099385 A1 4/2015 Ikeya

FOREIGN PATENT DOCUMENTS

JP 2011-222229 11/2011
JP 2015-72796 4/2015

* cited by examiner

WATERPROOF CONNECTOR

BACKGROUND

Field of the Invention

The invention relates to a waterproof connector.

Related Art

Japanese Unexamined Patent Publication No. 2011-222229 discloses a waterproof connector serving as a waiting connector to be mounted on a panel of a vehicle. This connector includes a panel-side connector housing to be inserted into an opening of the panel obliquely with respect to a plate surface of the panel. A panel contact flange protrudes out from the outer periphery of the connector housing and has a front surface facing the plate surface of the panel. A panel sealing member is mounted into a seal mounting groove provided in a front surface of the panel contact flange.

The sealing member has an annular shape to surround the outer periphery of the connector housing and seals a clearance between the panel contact flange and the panel by being held in close contact with the front surface of the panel contact flange and the plate surface of the panel. Note that the connector housing is arranged obliquely with respect to the plate surface of the panel to enable a worker to connect the connector easily.

If the connector housing is arranged obliquely with respect to the plate surface of the panel as described above, the worker often tries to mount the connector housing on the panel by bringing a lower end of the connector housing toward the plate surface of the panel, separating an upper end of the connector housing from the plate surface of the panel by a large amount and, in that state, inclining an upper part of the connector housing toward the panel with a lower end part as a support.

However, if the mounting operation is performed in this way, upper and lower end parts of the sealing member are deformed resiliently to twist and roll as the connector housing is inclined (rotated), and the connector housing may be held in close contact with the plate surface of the panel in that state. Thus, the sealing member may not be able to exhibit a predetermined sealing ability.

The invention was completed on the basis of the above situation and aims to enable a sealing member for sealing a clearance between a connector housing and a panel to exhibit predetermined sealing ability when a waterproof connector is arranged obliquely on the panel.

SUMMARY

The invention is directed to a waterproof connector with a connector housing including a housing body to be arranged in an opening of a panel while aligned obliquely with respect to a plate surface of the panel. A jaw protrudes out from the housing body and has one surface facing the plate surface of the panel. An annular sealing member surrounds an outer periphery of the connector housing and includes a panel lip to be held in close contact with the plate surface of the panel. The sealing member also has inner and outer housing lips to be held in close contact with the one surface of the jaw. A thickness of the sealing member in an in-out direction is reduced from the side of the housing lips to the side of the panel lip.

The inner and outer housing lips are held in close contact with the one surface of the jaw. Thus, a part of the sealing member on the side of the housing lips is supported stably on the jaw. When the connector housing is mounted on the panel, the panel lip is held in close contact with the plate surface of the panel to be deformed resiliently. However, the thickness of the sealing member in the in-out direction is reduced from the side of the housing lips stably supported on the jaw to the side of the panel lip. Accordingly, a resilient deformation amount of the panel lip side can be suppressed. Thus, even if the housing body is mounted on the panel by bringing one end of the housing body toward the plate surface of the panel and inclining a part of the housing body on the other end toward the plate surface of the panel with a part on the one side as a support, the panel lip is not deformed resiliently to twist and roll and a reduction in the sealing ability of the sealing member can be prevented.

There may be one panel lip. According to this configuration, the panel lip of the sealing member is no large resiliently deformation and a situation of rolling deformation can be avoided more reliably.

There may be inner and outer housing lips, and a top part of the panel lip may be arranged in a part of the sealing member outward of a center between the inner and outer housing lips in the in-out direction. If the panel lip is resiliently deformed inward a large mount, the panel lip may drop into the opening of the panel. However, according to the above configuration, the top part of the panel lip is arranged outward of the center between the housing lips. Thus, the top part of the panel lip can be separated sufficiently from the opening and a situation where the panel lip drops into the opening can be avoided.

The top part of the panel lip is arranged in a part of the sealing member between the respective top parts of the inner and outer housing lips in the in-out direction. According to this configuration, the respective top parts of the inner and outer housing lips and the top part of the panel lip are arranged in a well-balanced manner and the distortion and resilient deformation of the sealing member can be avoided.

DETAILED DESCRIPTION

Figure 1:
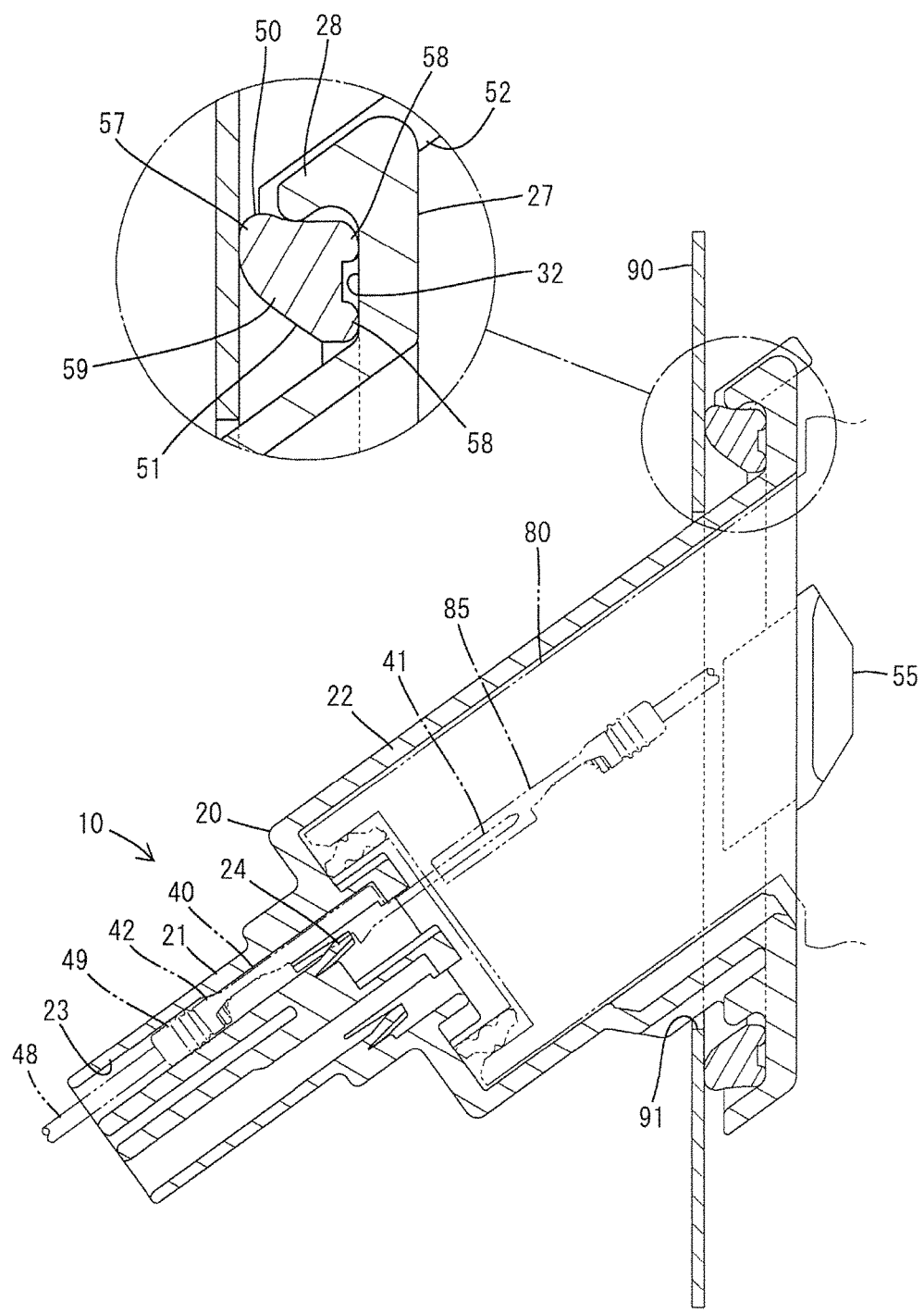
FIG. 1 is a section of a waterproof connector mounted on a panel in one embodiment of the present invention.

One embodiment is described with reference to FIGS. 1 to 8. A waterproof connector 10 according to this embodiment is a panel mounting type connector to be mounted on a panel 90 of an automotive vehicle and includes a connector housing 20 and a sealing member 50. The connector housing 20 is connectable to a mating connector 80 (see FIG. 1) while being mounted on the panel 90.

The panel 90 is a thin metal plate and includes an opening 91 penetrating in a plate thickness direction. If plate surfaces of the panel 90 are arranged perpendicularly along a vertical direction, as shown in FIG. 1, the connector housing 20 is inserted into the opening 91 with an axis along a connecting direction to the mating connector 80 oriented oblique to the vertical direction. Specifically, the connector housing 20 is arranged to intersect a front-rear direction, which is the plate thickness direction of the panel 90, in addition to the vertical direction such that a connection surface (opening surface of a receptacle 22 to be described later) faces obliquely up at predetermined angles of inclination with respect to the vertical direction and the front-rear direction. In the following description of the structure of the waterproof connector 10, unless otherwise noted, directions are based on a state where the axis of the waterproof connector 10 along the connecting direction is oriented in the front-rear direction and the connection surface of the waterproof connector 10 is facing forward for the sake of convenience.

The connector housing 20 is made of synthetic resin and integrally includes, as shown in FIG. 1, a terminal accommodating portion 21 substantially in the form of a rectangular block. The receptacle 22 is substantially in the form of a rectangular tube protruding radially out over the entire periphery from a front part of the terminal accommodating portion 21, particularly a part slightly behind the front end of the terminal accommodating portion 21, and extends forward from the protruding end. The receptacle 22 is a part equivalent to a housing body.

Cavities 23 extend in the front-rear direction in the terminal accommodating portion 21, and a locking lance 24 projects forward at the lower surface of an inner wall of each cavity 23. A terminal fitting 40 is inserted into each cavity 23 of the terminal accommodating portion 21 from behind. The terminal fitting 40 is inserted properly into the cavity 23 and resiliently locked by the locking lance 24 to be retained and held in the terminal accommodating portion 21.

Figure 2:
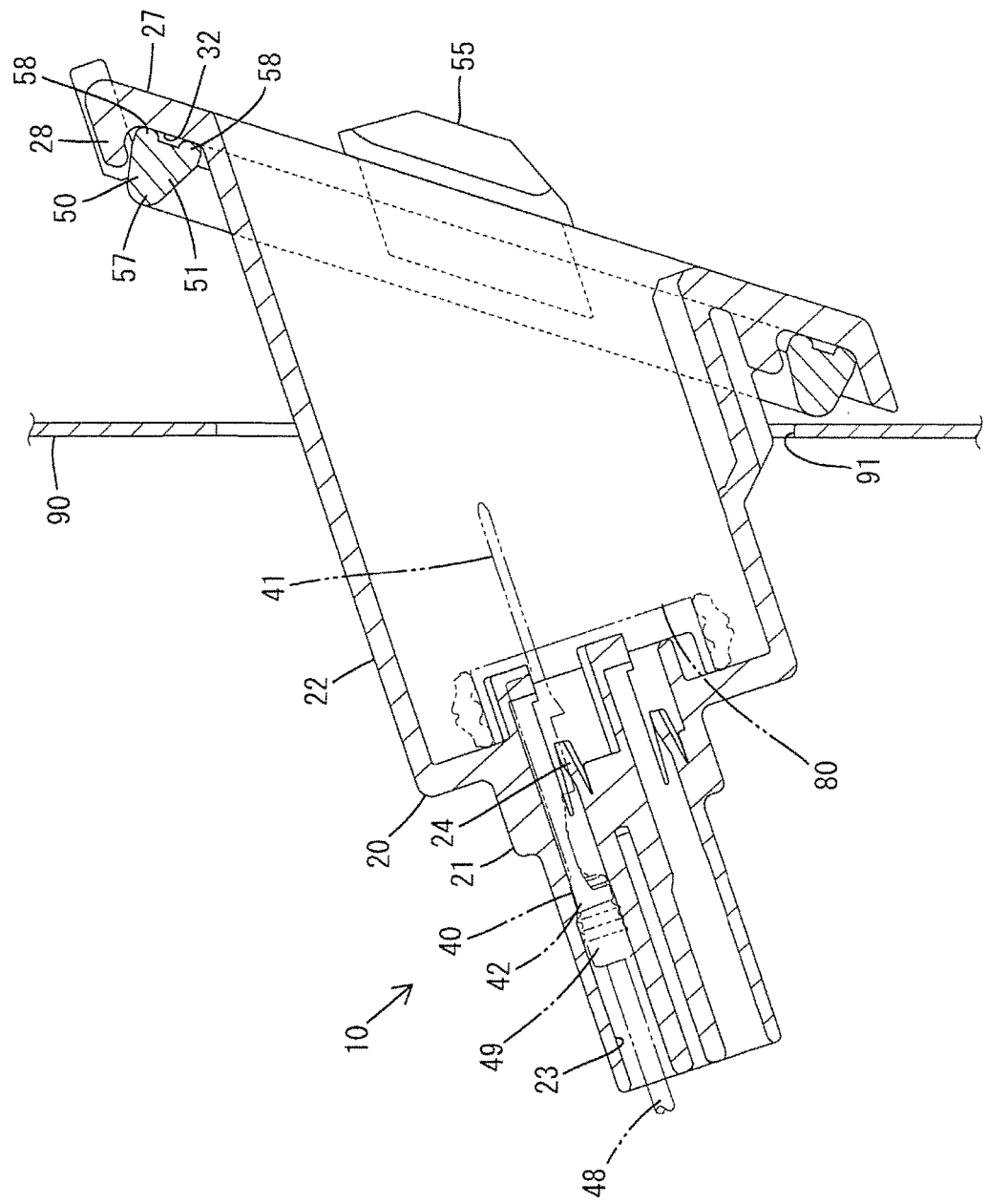
FIG. 2 is a view showing a state in the process of mounting the waterproof connector on the panel.

The terminal fitting 40 is formed integrally such as by bending a conductive metal plate. As shown in FIGS. 1 and 2, the terminal fitting 40 includes a pin-like tab 41 projecting forward and a barrel 42 in the form of an open barrel located behind the tab 41. The tab 41 projects into the receptacle 22, and is connected electrically to a female mating terminal fitting 85 provided in the mating connector 80 (see FIG. 1) as the connector housing 20 is connected to the mating connector 80. The barrel 42 is connected to a wire 48 and a rubber plug 49 by crimping, and electrically connected to a core part of the wire 48. The rubber plug 49 is held resiliently in close contact with the inner peripheral surface of a rear side of the cavity 23 to seal a clearance between the wire 48 and the cavity 23 when the terminal fitting 40 is inserted properly into the cavity 23.

Figure 3:
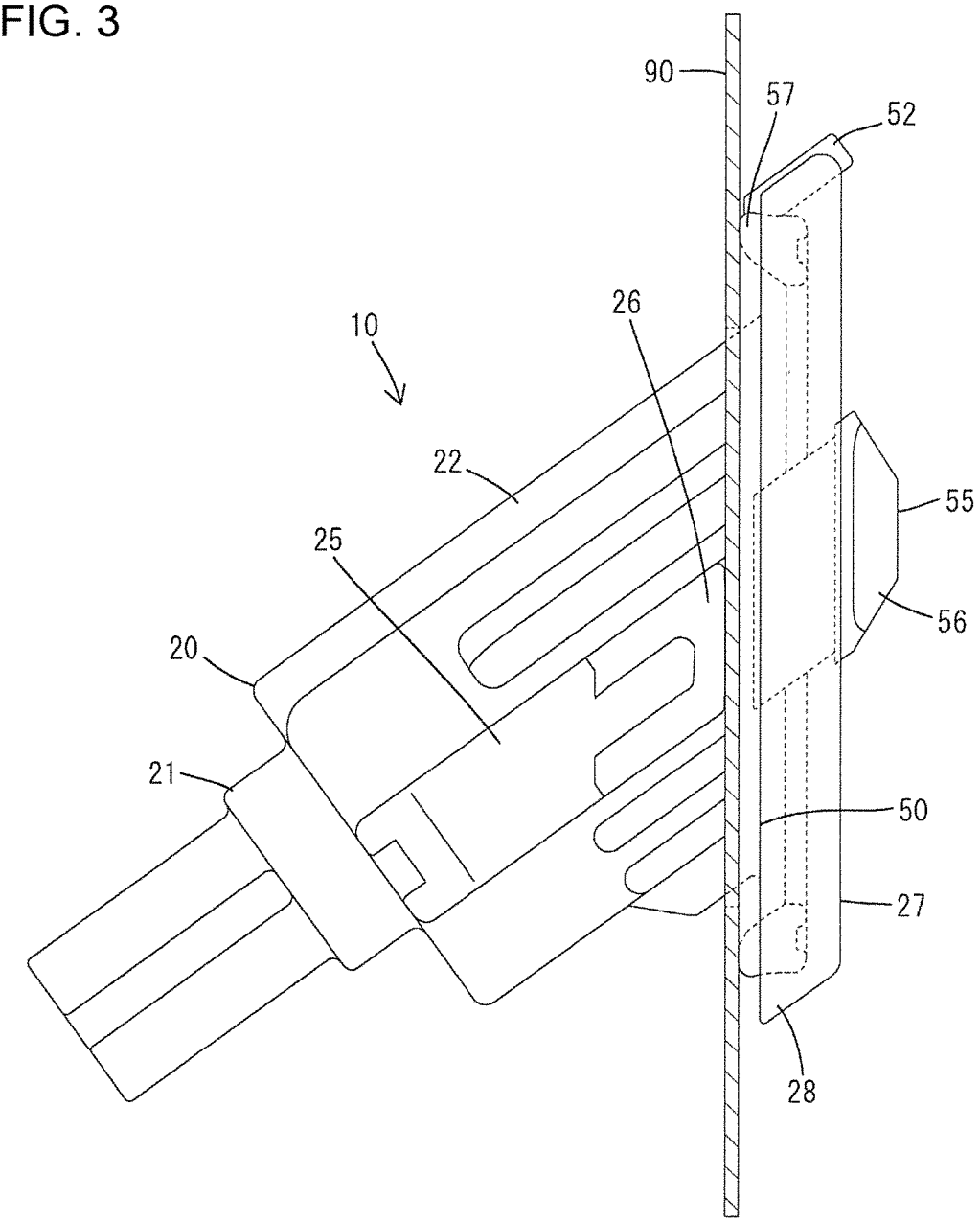
FIG. 3 is a side view of the waterproof connector mounted on the panel.
Figure 4:
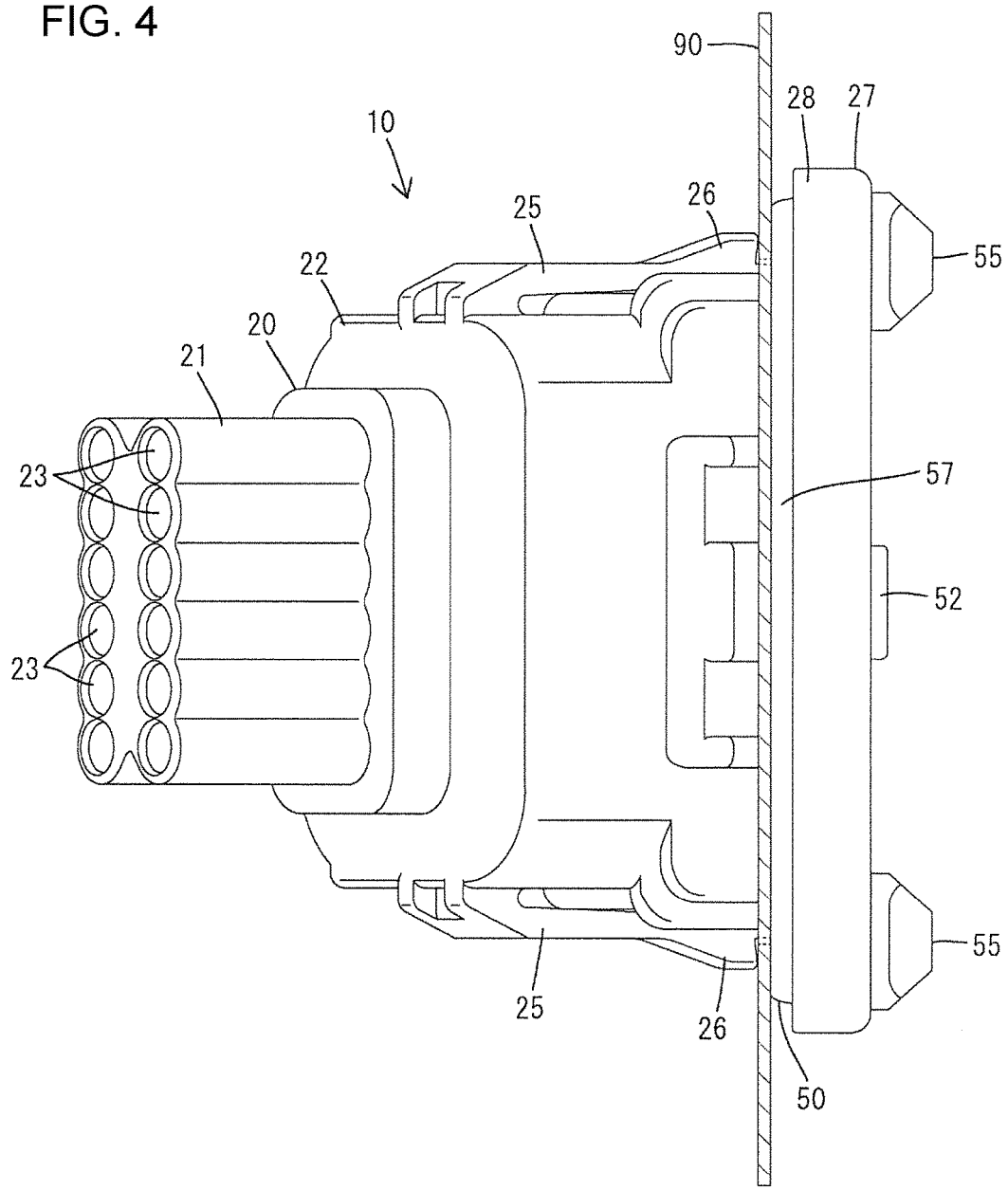
FIG. 4 is a bottom view of the waterproof connector mounted on the panel.

As shown in FIGS. 3 and 4, left and right panel locks 25 are provided on substantially vertically central parts of both outer side surfaces of the terminal accommodating portion 21. Each panel lock 25 is a cantilever rising out from the rear end of the outer side surface of the terminal accommodating portion 21 and extends forward from the rising end. A lock body 26 projects out on a front part of the panel lock 25. The front end surface of the lock body 26 faces and is lockable to the back surface of the panel 90. Further, the front end of the panel lock 25 and that of the lock body 26 are cut obliquely down to correspond to the front end of the receptacle 22 described below.

As shown in FIGS. 1 and 2, the front end of the receptacle 22 is cut obliquely at a predetermined angle of inclination with respect to the front-rear direction, which is an extending direction of the receptacle 22. The receptacle 22 includes a jaw 27 protruding out along a direction of inclination from the front end thereof. The jaw 27 is in the form of an annular plate protruding over the entire periphery from the front end of the receptacle 22, and is arranged with the front surface thereof facing obliquely down. The rear surface of the jaw 27 faces and is substantially in parallel to the front surface of the panel 90 via the sealing member 50.

The rear surface of the jaw 27 is recessed over the entire periphery to form a mounting groove 32 for the sealing member 50. An outer peripheral part 28 projects slightly rearward on the protruding end of the jaw 27 and the outer periphery of the mounting groove 32 is defined by the outer peripheral part 28.

Figure 5:
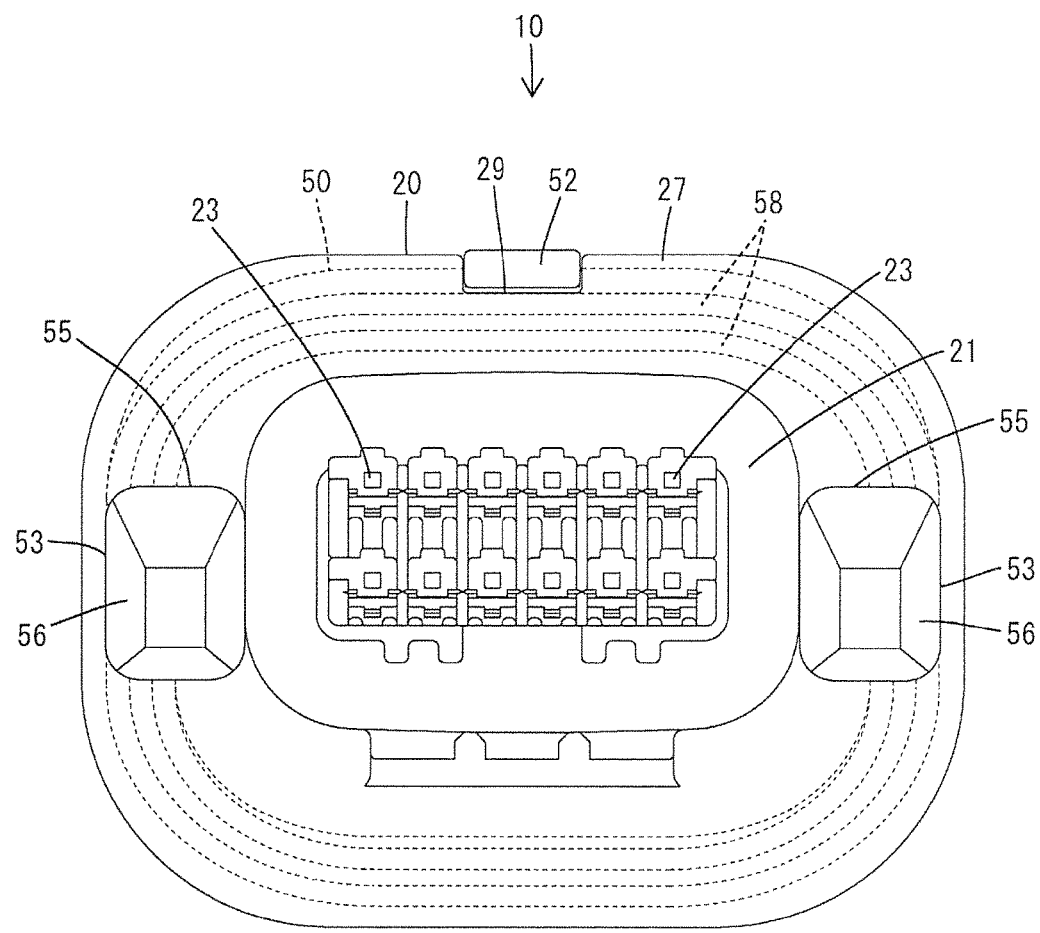
FIG. 5 is a front view of the waterproof connector.
Figure 6:
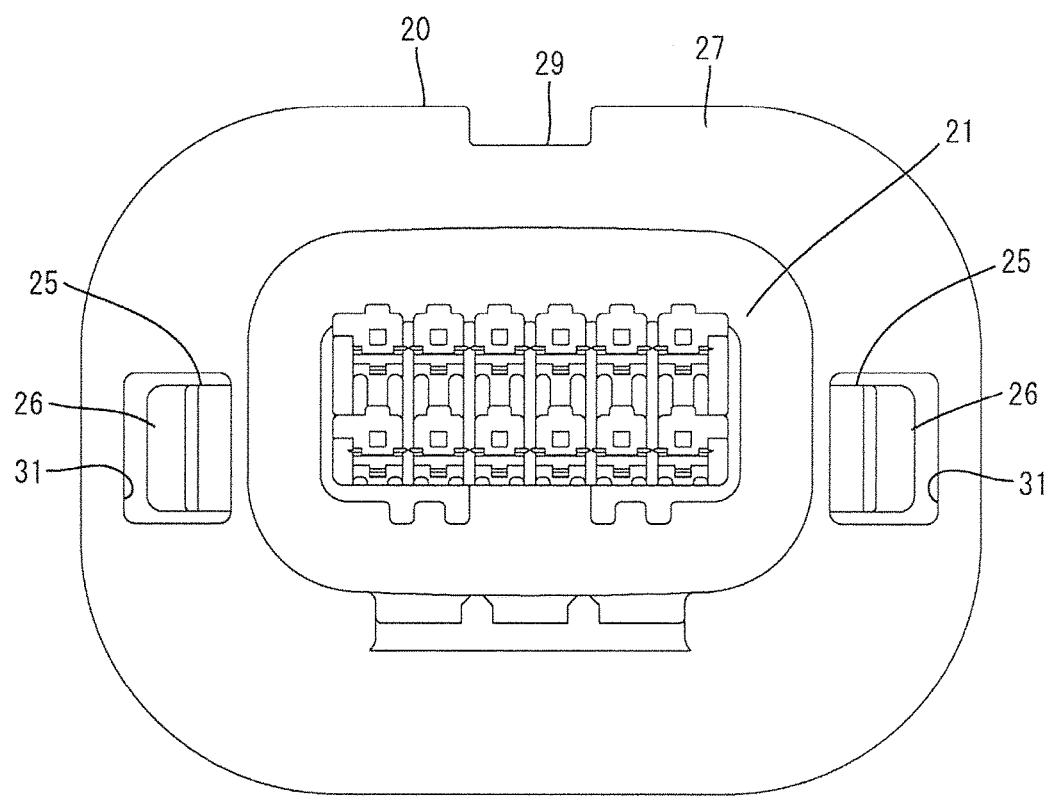
FIG. 6 is a front view of a connector housing.

As shown in FIGS. 5 and 6, an upper part of the jaw portion 27 protrudes less outward than a lower part. A rectangular recess 29 is provided in a substantially laterally central part of the upper end of the upper part of the jaw 27. The recess 29 is formed by cutting the outer peripheral part 28 to be open on the upper end, and penetrates in the front-rear direction.

As shown in FIG. 6, two locking holes 31 penetrate through vertically central parts of both lateral sides of the jaw 27. The locking holes 31 are openings substantially rectangular in a front view, and are arranged in front of the panel locks 25. When the connector housing 20 is viewed from the front, the panel locks 25 can be seen through the locking holes 31. These locking holes 31 are formed by the passage of a mold (not shown) for molding the front end shapes of the panel locks 25 including the lock bodies 26.

Figure 7:
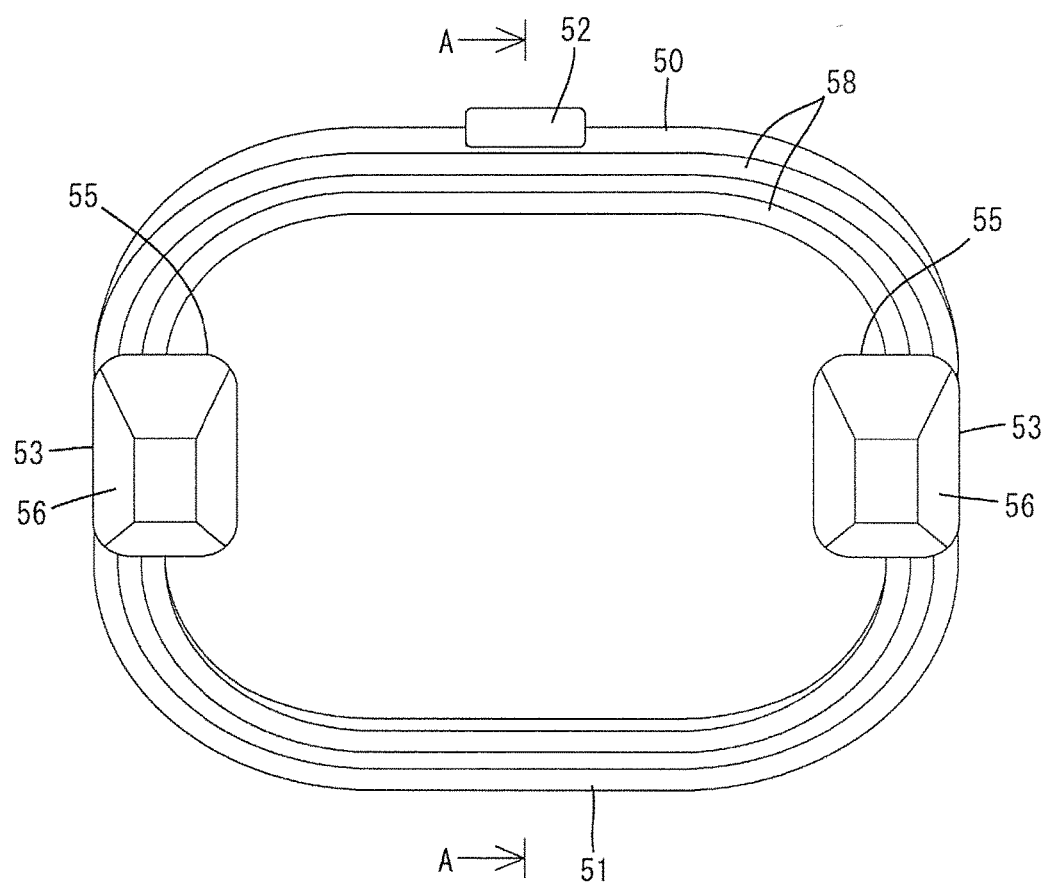
FIG. 7 is a front view of a sealing member.
Figure 8:
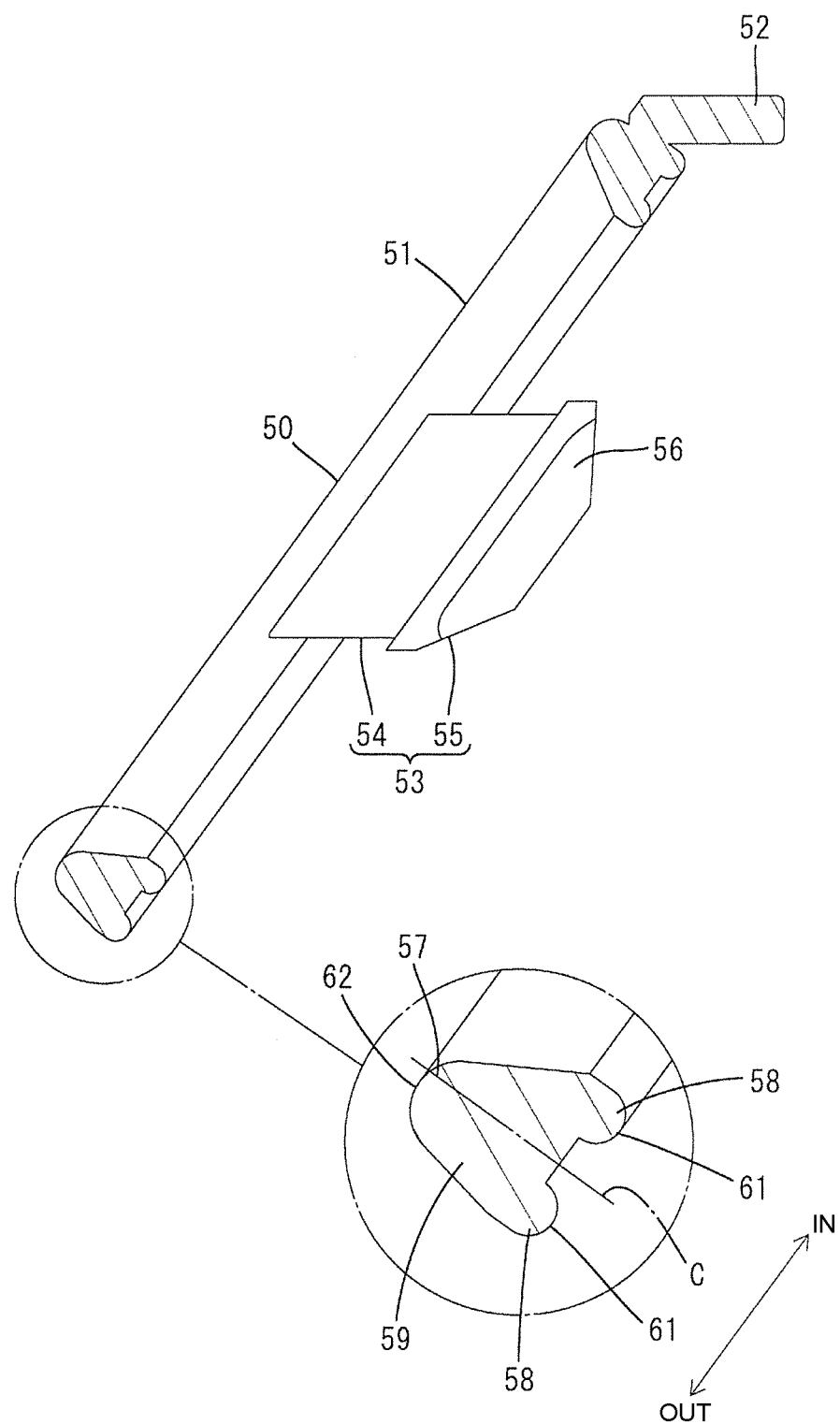
FIG. 8 is a section along A-A of FIG. 7.

The sealing member 50 is made of rubber, such as silicon rubber, and includes, as shown in FIGS. 1 and 2, a sealing body 51 finable into the mounting groove 32 while surrounding the outer periphery of the connector housing 20. The sealing body 51 is a rectangular ring with rounded corners, as shown in FIG. 7, and is oriented to be inclined down at a predetermined angle of inclination with respect to the front-rear direction (direction of the axis along the connecting direction), as shown in FIG. 8. A projection 52 projects substantially horizontally forward in a substantially laterally central part of an upper side part of the sealing body 51. The projection 52 is rectangular in a plan view and projects slightly higher on the upper side of the sealing body 51 (outer surface of an intermediate portion 59 to be described later), and can fit into the recess 29 of the jaw 27, as shown in FIG. 5.

As shown in FIGS. 7 and 8, left and right projections 53 project substantially horizontally forward in substantially vertically central parts of both lateral sides of the sealing body 51. Each projection 53 is composed of a base 54 in the form of a rectangular block projecting in as well as forward on the lateral side of the sealing body 51 and an expanded portion 55 connected to a front part of the base 54 via a step. The front and rear surfaces (peripheral surfaces orthogonal to the outer surface of the base 54) of the expanded portion 55 are flat and are arranged obliquely with respect to the front-rear direction. Further, slopes 56 for reducing vertical and lateral dimensions toward the front surface are provided on outer side surfaces of the expanded portion 55.

As shown in FIG. 8, the sealing body 51 is composed of one panel lip 57 projecting rearward, inner and outer housing lips 58 projecting forward. The intermediate portion 59 located between the panel lip 57 and the housing lips 58 gradually reduces a thickness in an in-out direction from the side of the housing lips 58 toward the side of the panel lip 57. Note that the in-out direction is a radial in-out direction of the sealing member 50 (see arrows of FIG. 8) and equivalent to the vertical direction along the plate surfaces of the panel 90 shown in FIGS. 1 to 3.

As shown in FIGS. 7 and 8, the panel lip 57 goes around over the entire circumference on a rear end of the intermediate portion 59, has an arcuate cross-section, and is arranged such that an arcuate top part 62 faces forward. The inner and outer surfaces of the panel lip 57 are continuous and flush with those of the intermediate portion 59 without any step.

Both housing lips 58 go around over the entire periphery on inner and outer peripheral parts of a front end of the intermediate portion 59, have an arcuate cross-section and are arranged such that arcuate top parts 61 face forward. The housing lips 58 are smaller than the panel lip 57. The respective outer surfaces of the housing lips 58 are continuous and flush with the outer surface of the intermediate portion 59 without any step. The respective inner surfaces of the both housing lips 58 project from the front end of the intermediate portion 59.]

The top part 62 of the panel lip 57 is arranged while deviating outward from a center line C (see FIG. 8) orthogonal to the in-out direction through a thickness center of the sealing member 50 in the in-out direction. In other words, the top part 62 of the panel lip 57 is arranged while deviating outward from a center between the housing lips 58 in the in-out direction. Further, the top part 62 of the panel lip 57 is arranged between the top parts 61 of the housing lips 58 and closer to the top part 61 of the outer housing lip 58. The inner surface of the intermediate portion 59 is inclined more outward toward the top part 62 of the panel lip 57 in the in-out direction.

The sealing member 50 is mounted on the connector housing 20 from behind. At this time, the projection 52 is located to correspond to the recess 29 so that the sealing member 50 is corrected to have a proper mounting posture with respect to the connector housing 20. When the sealing member 50 is inserted into the mounting groove 32 of the jaw 27, the projection 52 is fit and arranged in the recess 29 and the expanded portions 55 of the projections 53 resiliently pass through the locking holes 31 and are arranged to lock to the front surface of the jaw 27 while being guided by the slopes 56 (see FIG. 5). In this way, the bases 54 of the projections 53 are inserted into the locking holes 31 and the inner and outer housing lips 58 are in close contact with inner and outer peripheral parts of the back surface of the mounting groove 32 (rear surface of the jaw portion 27) in a circumferential direction.

Next, an operation of mounting the connector housing 20 on the panel 90 is described. Note that, in the following description, a direction along the plate surfaces of the panel 90 (surface direction) is the vertical direction and the plate thickness direction of the panel 90 is the front-rear direction.

The connector housing 20 is inserted into the opening 91 of the panel 90 from the front surface toward the back surface. In this way, a rear part of the connector housing 20 is located on the back surface of the panel 90 and the jaw 27 faces the front surface of the panel 90.

Subsequently, as shown in FIGS. 2 and 1, the lower part of the jaw 27 and the lower part of the sealing member 50 are arranged in contact with an edge of the opening 91 on the front surface side of the panel 90 and, in that state, the connector housing 20 is so rotated that the upper part of the jaw 27 and the upper part of the sealing member 50 are inclined toward the front surface of the panel 90 with the lower part of the jaw portion 27 or the lower part of the sealing member 50 as a support.

When the jaw 27 is substantially parallel to the front surface of the panel 90 and the connector housing 20 is rotated to be arranged at a predetermined angle of inclination with respect to the panel 90, as shown in FIG. 1, the lock bodies 26 of the panel locks 25 resiliently pass through the opening 91 and are arranged to lock to the edge of the opening 91 on the back surface of the panel 90 (see FIG. 3). In this way, the panel 90 is sandwiched between the lock bodies 26 of the panel locks 25 and the jaw 27 via the sealing member 50, and the connector housing 20 is mounted in a state inclined at the predetermined angle of inclination with respect to the panel 90.

As the connector housing 20 is mounted on the panel 90, the panel lip 57 of the sealing member 50 is arranged in close contact with the edge of the opening 91 on the front surface of the panel 90 in the circumferential direction. At this time, the panel lip 57 is held in close contact with the front surface of the panel 90 while being resiliently deformed somewhat outward, and is arranged such that the outer surface thereof is exposed between the outer peripheral part 28 and the panel 90, as shown in FIG. 3. Thereafter, the mating connector 80 is obliquely inserted into the receptacle 22 from above and connected to the connector housing 20 (see FIG. 1).

In the case of mounting the connector housing 20 on the panel 90 by rotating the connector housing 20, as described above, the panel lip 57 of the sealing member 50 may slide on the plate surface of the panel 90 and receive an external force in a twisting direction in a rotating process of the connector housing 20. If the panel lip 57 rolls to deform upon receiving the external force in the twisting direction, the sealing member 50 cannot exhibit a predetermined sealing ability.

However, in the case of this embodiment, the inner and outer housing lips 58 are arranged in close contact with the back surface of the mounting groove 32 of the jaw 27 so that the sealing member 50 I supported stably on the jaw 27. Further, the intermediate portion 59 of the sealing member 50 is formed to become gradually thinner from the side of the housing lips 58 toward the side of the panel lip 57. Accordingly, a resilient deformation amount of the panel lip 57 held in close contact with the panel 90 is small. Thus, even if the panel lip 57 receives the external force in the twisting direction in the rotating process of the connector housing 20, resilient deformation is suppressed and a situation where the panel lip 75 rolls to deform can be avoided. As a result, the sealing member 50 can exhibit a predetermined sealing ability. Particularly, since there is only one panel lip 57, the resilient deformation amount of the panel lip 57 can be suppressed to be small, and the situation where the panel lip 75 rolls to deform is avoided reliably.

Further, in the case of this embodiment, there are two inner and outer housing lips 58, and the top part 62 of the panel lip 57 is arranged outwardly of the center (see center line C of FIG. 8) between the inner and outer housing lips 58 in the in-out direction. Thus, when the connector housing 20 is mounted on the panel 90, the top part 62 of the panel lip 57 can be separated sufficiently from the opening 91 and a situation where the panel lip 57 drops into the opening 91 can be avoided.

Furthermore, since the top part 62 of the panel lip 57 is arranged in the part of the sealing member 50 between the top parts 61 of the inner and outer housing lips 58 in the in-out direction, the respective top parts 61 of the inner and outer housing lips 58 and the top part 62 of the panel lip 57 are arranged in a well-balanced manner and the distortion and resilient deformation of the sealing member 50 can be avoided.

Note that the connector housing 20 may be inserted into the opening 91 such that the jaw 27 is parallel to the plate surface of the panel 90, and directly mounted on the panel 90 without performing the mounting operation accompanied by rotation as described above.

Other embodiments are described briefly below.

The sealing member may include three or more inner and outer housing lips.

The sealing member may be configured as a grommet for covering a part from the outer periphery of the connector housing to pulled-out end parts of the wires.

The connector housing may be mounted on the panel after being connected to the mating connector.

The waterproof connector may be a female connector with a block-shaped housing body capable of accommodating female terminal fittings.

LIST OF REFERENCE SIGNS

10 . . . waterproof connector
20 . . . connector housing
22 . . . receptacle (housing body)
27 . . . jaw portion
32 . . . mounting groove
50 . . . sealing member
51 . . . sealing body
57 . . . panel lip
58 . . . housing lip
59 . . . intermediate portion
61 . . . top part of housing lip
62 . . . top part of panel lip
90 . . . panel
91 . . . opening

The invention claimed is:

1. A waterproof connector, comprising:
a connector housing including a housing body to be arranged in an opening of a panel obliquely with respect to a plate surface of the panel and a jaw portion protruding outward from the housing body, the jaw protruding through the opening of the panel and having one surface facing the plate surface of the panel; and
a sealing member having an annular shape to surround an outer periphery of the connector housing and including one panel lip on one side thereof to be held in contact with the plate surface of the panel, inner and outer housing lips on the opposite side having top parts to be held in contact with the one surface of the jaw and an intermediate portion gradually reducing a thickness in an in-out direction from a side of the sealing member that has the housing lips to a side of the sealing member that has the panel lip;
inner and outer surfaces of the panel lip being continuous with inner and outer surfaces of the intermediate portion without any step; and
a top part of the panel lip being arranged while deviating outward from a center line orthogonal to an in-out direction through a thickness center of the sealing member in the in-out direction, the inner surface of the intermediate portion being inclined more outward in the in-out direction toward the top part of the panel lip.

2. The waterproof connector of claim 1, wherein a top part of the panel lip is arranged in a part of the sealing member outwardly of a center between the inner and outer housing lips in the in-out direction.

3. The waterproof connector of claim 2, wherein the top part of the panel lip is arranged in a part of the sealing member between the respective top parts of the inner and outer housing lips in the in-out direction.

* * * * *